United States Patent [19]

Abbey et al.

[11] Patent Number: 4,522,962
[45] Date of Patent: Jun. 11, 1985

[54] EPOXY MODIFIED EMULSION POLYMERS

[75] Inventors: Kirk J. Abbey, Cleveland; James R. Erickson, Brunswick, both of Ohio

[73] Assignee: SCM Corporation, New York, N.Y.

[21] Appl. No.: 185,253

[22] Filed: Sep. 8, 1980

[51] Int. Cl.³ .......................... C08G 59/00; C08K 3/20
[52] U.S. Cl. .................................. 523/410; 523/404; 525/117; 525/529; 525/530; 528/103
[58] Field of Search .............. 260/29.6 NR, 29.6 PM, 260/29.2 EP; 525/529, 117, 530; 528/103; 523/410, 404

[56] References Cited

U.S. PATENT DOCUMENTS

| | | | |
|---|---|---|---|
| Re. 25,880 | 10/1965 | Cline | 260/29.6 NR |
| 2,580,901 | 1/1952 | Erickson et al. | 260/29.6 TA |
| 3,099,638 | 7/1963 | Foster | 525/530 |
| 3,247,143 | 4/1966 | Masters et al. | 525/117 |
| 3,247,285 | 4/1966 | Belanger | 528/103 |
| 3,652,476 | 3/1972 | Fell | 525/117 |
| 3,657,196 | 4/1972 | Foster | 525/530 |
| 3,697,619 | 10/1972 | Nagata et al. | 525/529 |
| 3,943,082 | 3/1976 | Smith et al. | 528/108 |
| 3,950,294 | 4/1976 | Connelly et al. | 260/29.6 NR |
| 3,970,628 | 7/1976 | Connelly et al. | 525/529 |
| 4,028,294 | 6/1977 | Brown et al. | 260/29.6 NR |
| 4,111,770 | 9/1978 | Najvar | 525/527 |
| 4,137,277 | 1/1979 | Nordstrom | 525/117 |
| 4,151,131 | 4/1979 | Sekmakas et al. | 260/29.6 NR |
| 4,212,781 | 7/1980 | Evans et al. | 260/29.6 NR |

FOREIGN PATENT DOCUMENTS

| | | | |
|---|---|---|---|
| 112959 | 9/1979 | Japan | 525/529 |
| 1384435 | 2/1975 | United Kingdom . | |
| 1433064 | 4/1976 | United Kingdom . | |
| 2046767 | 11/1980 | United Kingdom . | |

OTHER PUBLICATIONS

Derwent Abst. 76556W/46 (J50097698) Mitsubishi Electric (8-2-75).
Derwent Abst. 79609W/48, Nippon Oil KK (J75034076), 11-5-75.
Derwent Abst. 53082W/32, Shimokawa (J50040642) 4-14-75.

*Primary Examiner*—Herbert J. Lilling
*Attorney, Agent, or Firm*—Thomas M. Schmitz

[57] ABSTRACT

Emulsion polymers produced by polymerizing ethylenically unsaturated monomers in an aqueous medium can be substantially improved by incorporating into the monomer mixture a minor amount of blend of epoxy resin and glycidyl acrylate. The epoxy modified emulsion polymers are particularly useful as ambient or low temperature thermosetting latices for film-forming coatings.

8 Claims, No Drawings

EPOXY MODIFIED EMULSION POLYMERS

BACKGROUND OF THE INVENTION

This invention pertains to emulsion polymerization of ethylenically unsaturated monomers in an aqueous medium and particularly to epoxy modified emulsion polymers.

Epoxy modified polymers are shown in U.S. Pat. No. 4,028,294 wherein epoxy resins described as polyepoxides of dihydric phenols such as bisphenols are blended with acrylic monomers and emulsion polymerized to provide thermosetting latex particles. Similarly, U.S. Pat. No. 3,970,628 discloses emulsion polymerized monomers containing epoxy resins.

It now has been found that substantially improved epoxy modified emulsion polymers can be produced by providing an epoxy blend of epoxy resin with glycidyl acrylate, glycidyl methacrylate or other oxirane containing ethylenic monomer. This epoxy blend can be produced by including the epoxy resin in the emulsion reaction medium by dissolving the epoxy resin in ethylenically unsaturated monomers prior to being added to the aqueous medium or by adding the epoxy resin simultaneously with the ethylenically unsaturated monomer as a separate pre-emulsified portion. The epoxy modified emulsion polymers of this invention provide substantially improved latices suitable for use as ambient or low temperature thermosetting film-forming binder for protective coatings. The cured coating exhibit improved salt spray resistance, solvent resistance, impact resistance as well as other desirable cured film integrity properties. These and other advantages will become more apparent by referring to the detailed Description of the Invention.

SUMMARY OF THE INVENTION

Briefly, an emulsion polymerization process is directed to copolymerizing ethylenic monomers with glycidyl acrylate or methacrylate or other oxirane monomer in the presence of moderate amounts of epoxy resin. The epoxy resin is mixed with the monomers prior to the addition of monomers to the reaction medium or added simultaneously with the monomers. The latex is particularly suitable for binders for protective coatings adapted to cure at room temperatures or low temperatures above room temperature.

DETAILED DESCRIPTION OF THE INVENTION

The process of this invention pertains to emulsion copolymerization of ethylenic monomers and oxirane monomers in the presence of epoxy resin to produce emulsion latex polymer particles containing oxirane groups in combination with epoxy resin containing epoxide groups. The ethylenic monomers, oxirane monomers, and epoxy resin can be either intermixed together prior to the emulsion polymerization process or the epoxy resin preferably can be separately emulsified. An important aspect of this process is that the epoxy resin is available during the free radical polymerization so as to yield an intimate blend. Other advantages such as chain transfer to the epoxy resin is believed to occur. Conventional aqueous emulsion polymerization is utilized at temperatures between about 45° C. and 95° C. in the presence of free radical initiators or polymerization catalysts.

Referring first to the monomers, the oxirane monomers characteristically contain oxirane functionality

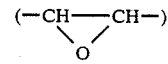

as well as pendant ethylenic double bond unsaturation and includes, for example, acrylic, methacrylic, or vinyl derivatives of glycidol. Preferred oxirane monomers contain pendant oxirane and include glycidyl acrylate, glycidyl methacrylate, and allyl glycidyl ether. The oxirane monomers can be copolymerized with ethylenically unsaturated monomers which include, for example, vinyl aromatic and aliphatic hydrocarbons such as styrene, alpha-methyl styrene and similar substituted styrenes, vinyl naphthalene, vinyl toluene, divinyl benzene, and vinyl aliphatic hydrocarbons such as 1,3-butadiene, methyl-2-butadiene, 2,3-dimethyl butadiene, cyclopentadiene and dicyclopentadiene as well as ethylenically unsaturated esters and acids such as acrylic, methacrylic, ethacrylic, cinnamic and crotonic and the like and esters containing fumaric and maleic type unsaturation. Particularly preferred monomers include, for example, styrene, alpha-methyl styrene, tertiary butyl styrene, divinyl benzene, 1,3-butadiene, isoprene, alkyl acrylates such as ethyl acrylate, butyl acrylate, methyl-methacrylate, acrylonitrile, vinyl acrylate, and vinyl methacrylate as well as similar ethylenically unsaturated monomers. The monomer mixture on a weight basis can contain between 0.2% and 30% oxirane monomer and between 99.8% and 70% ethylenically unsaturated monomers.

The epoxy resin is a lower molecular weight epoxy resin characterized by the epoxy group

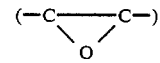

and can be represented by aromatic resins such as bisphenols reacted with epichlorohydrin, cycloaliphatic resins such as hydrogenated bisphenol based epoxy resins, and partially epoxidized vegetable oils. The epoxy can be a linear epoxy polymer chain although side chain adducts can be produced by coreacting epichlorohydrin with other dihydric phenols or polyhydric phenols, polyalcohols, and polyfunctional halohydrins. Epichlorohydrin and dichlorohydrin are preferred reactants with phenols to provide pendant epoxy groups. The epoxy resin should have an epoxide equivalent weight between 65 and 1800, and a molecular weight between about 100 and 4000. The epoxy resin can be illustrated as:

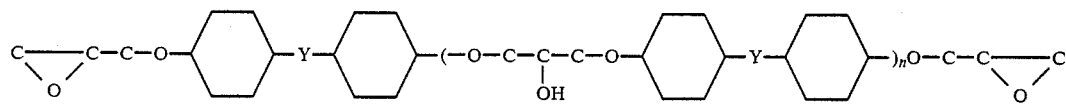

The preferred epoxy resin is a linear polymer chain having n repeating units of epichlorhydrin adducts of various bisphenols such as bisphenol-A, bisphenol-S, etc., wherein n can be between 0 and 4 and said epoxy resin is fluid or can be dispersed within the mixture of ethylenic and oxirane monomers and emulsion polymerized in accordance with the invention. The monomer and epoxy resin mixture can contain on a weight basis between about 0.1% and 30% ethylenically unsaturated oxirane monomer, 99.8% and 30% ethylenically unsaturated monomer, and 0.1% and 40% epoxy resin.

The monomer and epoxy resin mixture can be added initially or continuously or intermittently to an aqueous reaction medium over a period of 1 to 10 hours at temperatures between about 45° C. and 95° C. in the presence of initiators, surfactants, and emulsifiers. The polymerization catalyst or initiator can be one or more water soluble, free radical generating species such as hydrogen peroxide or the sodium, potassium or ammonium persulfate, perborates, peracetates, percarbonate, and the like. As is well known in the art, these initiators may be activated by a redox system such as sulfites and thiosulfites and redox promoters such as transition metal ions. Those skilled in the art will be aware that other polymerization initiators such as relatively water insoluble organic peroxides may also be used when compatible with the polymerization system herein employed. Other initiators are benzoyl peroxide, acetyl peroxide, lauryl peroxide, acetone peroxide, cumene hydroperoxide, and the like, as well as azobisisobutylnitrile and similar azo-compounds. The initiator is normally used in amounts between 0.1 and 2 weight percent based on monomer.

Suitable surfactants include anionic, nonionic and cationic emulsifiers. Examples of anionic surfactants include alkyl carboxylic acid salts, the alkyl sulfate salts, the alkyl sulfonate salts, the alkyl phosphate salts, the alkyl sulfo-succinate salts, the oligomeric and/or polymeric carboxylic acid salts, the alkyl aryl ether alcohols and the alkyl aryl polyether sulfate salts. Catonic emulsifiers include the alkyl imidazoline salts, the quarternary ammonium salts including one or two long alkyl chains, the alkyl pyridinium salts, the oligomeric and/or polymeric amine salts, and the alkyl aryl ammonium salts. Nonionic surfactants include ethylene oxide adducts of fatty alcohols or of alkyl phenols or naphthols, and the block copolymer of ethylene oxide and propylene oxide. Mixtures of surfactants can be utilized including nonionic surfactants admixed with either anionic or cationic surfactants. Surfactants are ordinarily used at the level of 0.06% to 6% by weight based on monomers.

The emulsion latex containing an in-situ intermixture of epoxy resin contains two types of oxirane reactivity, that is oxirane resin and oxirane containing ethlenically unsaturated monomer, which has been found to be ditinctly better than either moiety alone. The in-situ polymerization resulted in superior properties than achieved by a mechanical blend. The latices can be advantageously cured at ambient temperatures or close to room temperature, as well as at higher temperatures.

In use, the oxirane emulsion polymer containing epoxy resin can be cured in accordance with this invention by curing agents such as polyamines including amidoamines, oligomers of ethylene imine, amine functional acrylic resin and the like. Polymercaptans likewise are useful. Lesser preferred acidic or basic curing agents can be used but these often require moderate heat. The weight percent curing agent to be used is controlled, as is known in the art, by the oxirane equivalency of the oxirane emulsion polymer and the amine equivalency of the curing agent (or thiol equivalency, etc.). The ratio or these two values can be between about 1:3 and 3:1 and most preferably nearer to 1:1 equivalent of amine to oxirane, although wider ranges such as 10/1 can be used.

The merits of this invention are further illustrated in the following examples.

EXAMPLE 1

In accordance with the process of this invention, the epoxy resin is dissolved within the ethylenic monomers and reacted simultaneously.

|    | Component                                       | Wt. parts |
|----|-------------------------------------------------|-----------|
| A. | Deionized water                                 | 115.96    |
|    | Polywet KX-4 (Uniroyal)                         | 0.54      |
| B. | $K_2S_2O_8$                                     | 0.30      |
| C. | Butyl acrylate (BA)                             | 55.71     |
|    | Methyl methacrylate (MMA)                       | 44.84     |
|    | Glycidyl acrylate (GA)                          | 2.00      |
|    | Epon 828 (Shell)                                | 15.73     |
| D. | Deionized water                                 | 0.10      |
|    | Sodium formaldehyde sulfoxylate (A.W.C. Rice, Diamond Shamrock) | 0.01      |

Procedure:
(1) Charge A and heat to 83° C. with a nitrogen sparge.
(2) After 30 minutes change the nitrogen sparge to a blanket.
(3) Charge 3% of C and mix for 3 minutes.
(4) Charge B and allow to polymerize for 5 minutes.
(5) Feed the remainder of C over a 3-hour period.
(6) Add D after completing the monomer feed and hold for 1 hour.
(7) Cool and filter.

EXAMPLE 2

Latices were produced according to the process in Example 1, except that the components in Group C were follows:

|    | Component          | Wt. (a) | Wt. (b) |
|----|--------------------|---------|---------|
| C. | Butyl Acrylate     | 47.57   | 57.26   |
|    | Methyl Methacrylate| 42.21   | 45.34   |
|    | Glycidyl Acrylate  | 12.50   | 0       |
|    | Epon 828           | 0       | 18.73   |

Table I hereinafter presents test data for the above latices cured with 1,6-hexanediamine at room temperatures of about 20° C. to 25° C. and at low bake of about 75° C. The amount of diamine used was such that 1.25 amine nitrogens were available per oxirane moiety. For comparison, mechanical blends of glycidyl acrylate latices plus DER 331 (Dow) emulsions are similarly prepared and cured. The data shows that the mixture of oxirane source is better than either moiety singly, and further, that the in-situ mixture is better than the subsequently mechanically blended mixtures.

TABLE I

| | Oxirane Distribution[a] Monomer/Resin | Actual Oxirane[b] | Responses After Cure With 1,6-Hexanediamine | | | |
|---|---|---|---|---|---|---|
| | | | Salt Spray[c] 25°/75° C. | Solvent Resistance[d] 25°/75° C. | Reverse Impact[e] 25°/75° C. | Gel Content (%)[f] 25°/75° C. |
| Example 1 | .16/.67 | .82 | 4.0/7.1 | >200/>200 | >160/>160 | 36/53 |
| Comp. Ex. 2a | .95/0 | .79 | 0/0 | 62/>200 | 50/<10 | 75/87 |
| Comp. Ex. 2b | 0/.80 | .78 | 0/7.0 | 0/27 | >160/>160 | 3/3 |
| Blend 1 | 0/.79 | .79 | 0/6.9 | 37/38 | >160/>160 | 30/37 |
| Blend 2 | .16/.67 | .79 | 0/7.2 | 86/144 | >160/>160 | 55/— |
| Blend 3 | .40/.48 | .76 | 0/0 | 139/>200 | >160/>160 | 64/68 |

[a]Theoretical milli-equivalents per gram solids based on starting materials.
[b]Experimentally determined milli-equivalents per gram solids by titration.
[c]Evaluated after aging 10 days on iron-phosphated cold rolled steel; 0 — total failure, 8 — no failure.
[d]Double rubs with a rag soaked with methyl ethyl ketone.
[e]⅜ inch ball; expressed as inch - pounds.
[f]After 3 days in acetone as solvent. Note Comparative Example 2a had a gel content of 80% before diamine was added.

EXAMPLE 3

These examples and comparative examples vary somewhat in the type and amount of ingredients relative to Example 1, but the procedure is significantly different. The procedure herein described is desirable since the reactor is slightly cleaner at the end of the reaction. Table II presents recipes and the procedure follows. Table III presents salt spray evaluations.

TABLE II

| Ingredients | | (c) | (d) | (e) | (f) |
|---|---|---|---|---|---|
| A | DI. H₂O | 103.74 | 103.74 | 109.74 | 109.74 |
| (surfactant | KX-4 | 0.70 | 0.70 | 0.70 | 0.70 |
| and | NaHCO₃ | 0.374 | 0.374 | — | — |
| buffer | NaOH | 0.127 | 0.127 | — | — |
| B | K₂S₂O₈ | 0.40 | 0.40 | 0.40 | 0.40 |
| (initiator) | D.I. H₂O | 12.00 | 12.00 | 12.00 | 12.00 |
| C | BA | 46.36 | 31.94 | 46.36 | 31.94 |
| (first | MMA | 41.14 | 25.98 | 41.14 | 25.98 |
| stage | GA | 12.50 | 1.407 | 12.50 | 1.407 |
| monomer | Epon 828 | — | 15.67 | — | 15.67 |
| feed) | CHCl₃ | 0.50 | 0.352 | — | — |
| B' | K₂S₂O₈ | 0.20 | 0.70 | — | — |
| (initiator) | D.I. H₂O | 6.00 | 6.00 | — | — |
| C' | BA | — | 13.46 | — | 13.46 |
| (second | MMA | — | 10.95 | — | 10.95 |
| stage | GA | — | 0.593 | — | 0.593 |
| monomer | CHCl₃ | — | 0.148 | — | — |
| feed) | | | | | |
| D | A.W.C. Rice | 0.01 | 0.01 | 0.01 | 0.01 |
| (reductant) | D.I. H₂O | 0.10 | 0.10 | 0.10 | 0.10 |
| E | Super Ad-It | 0.10 | 0.10 | 0.10 | 0.10 |
| (fungicide) | (Tenneco Chemicals) | | | | |

Procedure for Example 3.
1. Change A to Morton flask equipped with paddle stirrer, condenser, and thermometer; heat to 83° C. bath temperature; sparge with N₂.
2. Remove sparge but continue N₂ blanket; charge 3% of monomers (C+C') and mix for 3 minutes.
3. Charge B, stir for 5 minutes, and start feed (C).
4. Meter C (and C') over 3 hours
5. Charge B' at midpoint of feed period.
6. When C (and C') is all in, charge D; hold for 1 hour.
7. Cool to 30° C. or less.
8. Add E dispersed in a small amount of water, dropwise with stirring.
9. Filter (100 mesh screen) and store.

Paints were prepared using these latices substituted into a proprietary formulation and evaluated both with and without the curing agent 1,6-hexanediamine.

TABLE III

| | Salt Spray Performance | | | |
|---|---|---|---|---|
| | Without Curing Agent | | With Curing Agent | |
| Sample | 240 hours Rating | 672 hours Rating | 240 hours Rating | 672 hours Rating |
| Comp. (c) | 0.5 | 0 | 9.0 | 0.5 |
| Exam. (d) | 2.5 | 0 | 9.5 | 5.5 |
| Comp. (e) | 6.0 | 0.5 | 9.0 | 0.5 |
| Exam. (f) | 0.5 | 0 | 8.5 | 7.0 |
| Proprietary | 9.0 | 8.5 | 9.5 | 0.5 |

The paint films were evaluated over cleaned cold rolled steel panels after the paint films were cured at room temperatures for 1 week.
Test Rating: 0=total failure; 10=excellent panel

EXAMPLE 4

The procedure of this example differs considerably from the previous examples. Herein the epoxy resin was added separately but concurrent to the ethylenically unsaturated monomers as an emulsion, which had been previously prepared. At the end of the reaction the resultant polymer dispersion was found to filter much more cleanly than the other examples and the reactor contained no adherent resin.

Table IV give the recipe for the epoxy resin pre-emulsion and the procedure follows the table. This emulsion was normally prepared 24 hours in advance but was found to still be usable at least for one week when stored at 20° C.

TABLE IV

| | Epon 828 Pre-emulsion | |
|---|---|---|
| Group | Material | Parts |
| A | Deionized Water | 100.00 |
| | Siponate DS-10 (Alcolac) | 0.20 |
| | Triton X-100 (Rohm & Haas) | 0.72 |
| B | Epon 828 | 100.00 |

Procedure:
(1) Prepare solution A and heat to 60° C.
(2) Heat B to 60° C. in a container and agitate with a Cowles type mixer (a Premier Dispensator with a Cowles blade was used).
(3) Add A, in portions of 10% every 3-4 minutes to B adjusting the mixer speed as required (the mixture thickens requiring higher speeds). (The initially formed water-in-oil emulsion will invert to an oil-in-water emulsion during the third or fourth portion).
(4) Add remaining A slowly and continuously after the emulsion inverts.
(5) Cool to room temperature.

A latex was prepared using this pre-emulsion according to the recipe of Table V. The procedure follows the table.

TABLE V

Recipe Using Epoxy Resin Pre-Emulsion

| Group | Material | Wt. parts |
|---|---|---|
| A | Deionized H$_2$O | 92.61 |
|   | Polywet KX-4 | 0.54 |
| B | K$_2$S$_2$O$_8$ | 0.30 |
|   | Deionized H$_2$O | 12.00 |
| C | BA | 48.02 |
|   | MMA | 35.30 |
|   | GMA (glycidyl methacrylate) | 5.00 |
| D | Pre-Emulsion | 23.36 |
| E | A.W.C. Rice | 0.01 |
|   | Deionized H$_2$O | 0.10 |
| F | Super Ad-It | 0.10 |
|   | Deionized H$_2$O | 1.00 |

Procedure:
(1) Heat A to 83° C. under a N$_2$ sparge.
(2) Charge 3% of C and agitate for 5 minutes.
(3) Change N$_2$ sparge to blanket, then charge B, wait 5 minutes.
(4) Start feeding C and D simultaneously at such a rate that C requires 3 hours and D requires 2 hours.
(5) After C has been entirely added, charge E and hold at 83° C. for 1 hour.
(6) Cool to about 30° C. and add F.
(7) Filter through 200 mesh screen and store.

EXAMPLES 5–11

These preparations are essentially the same as Example 4 with recipe modifications. Table VI presents these changes.

TABLE VI

Further Examples Using An Epoxy Pre-Emulsion

| Group | Material | Ex. 5 | Ex. 6 | Ex. 7 | Ex. 8 | Ex. 9 | Ex. 10 | Ex. 11 |
|---|---|---|---|---|---|---|---|---|
| A | Deionized H$_2$O | 92.61 | 88.82 | 88.82 | 88.42 | 83.33 | 83.18 | 88.63 |
|   | Polywet KX-4 | 0.54 | 0.54 | 0.54 | 0.54 | 0.54 | 0.54 | 0.54 |
| C | BA | 48.78 | 45.90 | 46.67 | 46.32 | 42.70 | 43.38 | 45.67 |
|   | MMA | 37.54 | 33.63 | 35.86 | 35.58 | 31.10 | 33.27 | 33.44 |
|   | GMA | 2.00 | 5.00 | 2.00 | 2.00 | 5.00 | 2.00 | 5.00 |
| D | Pre-Emulsion Epon 828 | 23.36 | 30.94 | 30.94 | — | — | — | — |
|   | Pre-Emulsion Eponex 1510 (Shell) | — | — | — | 32.20 | 42.40 | 42.70 | 31.80 |

COMPARATIVE EXAMPLES 12–14

These materials were prepared for comparative purposes and followed Example 4 except for recipe changes presented here in Table VII.

TABLE VII

Comparative Examples

| Group | Materials | Ex. 12 | Ex. 13 | Ex. 14 |
|---|---|---|---|---|
| A | Deionized H$_2$O | 86.29 | 104.53 | 79.53 |
|   | Polywet KX-4 | 0.54 | 0.54 | 0.54 |
| C | BA | 45.76 | 52.18 | 41.86 |
|   | MMA | 36.24 | 33.58 | 33.14 |
|   | GMA | — | 14.24 | — |
| D | Pre-Emulsion Epon 828 | 36.00 | — | — |
|   | Pre-Emulsion Eponex 1510 | — | — | 50.00 |

The foregoing are examples illustrating the merits of this invention but are not intended to be limiting except as defined by the appended claims.

We claim:

1. In an emulsion polymerization process the improvement comprising the steps of:
providing a blend comprising on a weight basis, between 0.1% and 40% of an epoxy resin polymer, between 30% and 99.8% ethylenically unsaturated monomers, and between 0.1% and 30% oxirane containing ethylenically unsaturated monomers, and polymerizing said blend in an aqueous medium in the presence of polymerization catalysts to copolymerize said ethylenically unsaturated monomers with said oxirane containing ethylenically unsaturated monomers to form an oxirane polymer and provide an in situ emulsified blend of oxirane polymer and said epoxy resin polymer.

2. The composition in claim 1 wherein the oxirane monomer contains a pendant double bond and is a derivative of glycidol.

3. The composition in claim 1 wherein the oxirane monomer is selected from an acrylic, a methacrylic, or a vinyl derivative of glycidol.

4. The composition in claim 1 wherein the oxirane monomer is selected from glycidyl acrylate, glycidyl methacrylate, or allyl glycidyl ether.

5. The composition in claim 1 wherein the epoxy resin is a linear polymer.

6. The composition in claim 1 wherein the composition contains a multi-functional amino or mercapto cross-linker adapted to cross-link said polymer.

7. A coating composition containing the polymer composition in claim 1 wherein the coating is curable to provide a protective surface coating.

8. A coating composition in claim 1 wherein the composition contains an amine or mercaptan cross-linker for cross-linking the coating upon curing.

* * * * *